(12) United States Patent
Takeda et al.

(10) Patent No.: US 11,291,033 B2
(45) Date of Patent: Mar. 29, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/650,688

(22) PCT Filed: Sep. 29, 2017

(86) PCT No.: PCT/JP2017/035701
§ 371 (c)(1),
(2) Date: Mar. 25, 2020

(87) PCT Pub. No.: WO2019/064569
PCT Pub. Date: Apr. 4, 2019

(65) Prior Publication Data
US 2021/0204311 A1    Jul. 1, 2021

(51) Int. Cl.
*H04W 72/12* (2009.01)
*H04W 72/04* (2009.01)

(52) U.S. Cl.
CPC ... *H04W 72/1289* (2013.01); *H04W 72/0446* (2013.01); *H04W 72/1268* (2013.01)

(58) Field of Classification Search
CPC ......... H04W 72/1289; H04W 72/0446; H04W 72/1268
USPC .......................................................... 370/366
See application file for complete search history.

(56) References Cited

U.S. PATENT DOCUMENTS

2010/0271970 A1* 10/2010 Pan ..................... H04L 1/0029
370/252

OTHER PUBLICATIONS

International Search Report issued in PCT/JP2017/035701 dated Nov. 28, 2017 (2 pages).
Written Opinion of the International Searching Authority issued in PCT/JP2017/035701 dated Nov. 28, 2017 (4 pages).
LG Electronics; "Discussion on scheduling in time domain for NR"; 3GPP TSG RAN WG1 NR-AdHoc neeting, R1-1700509; Spokane, USA; Jan. 16-20, 2017 (4 pages).
Ericsson; "On scheduled DL HARQ feedback transmission in UL"; TSG-RAN WG1 #86bis, R1-1609624; Lisbon, Portugal; Oct. 10-14, 2016 (3 pages).
ZTE, ZTE Microelectronics; "On Indicating HARQ and PUCCH"; 3GPP TSG-RAN WG1 Meeting #86bis, R1-1608958; Lisbon, Portugal; Oct. 10-14, 2016 (4 pages).

(Continued)

*Primary Examiner* — Peter G Solinsky
(74) *Attorney, Agent, or Firm* — Osha Bergman Watanabe & Burton LLP

(57) ABSTRACT

To prevent deterioration of communication quality even when uplink data and uplink control information are transmitted by using an uplink shared channel in a future radio communication system, one aspect of a user terminal according to the present invention includes: a transmission section that transmits an uplink shared channel over multiple slots based on an instruction from a base station; and a control section that performs control to multiplex uplink control information on the uplink shared channel in at least one slot of the plurality of slots to transmit.

7 Claims, 14 Drawing Sheets

(56) References Cited

OTHER PUBLICATIONS

NTT Docomo, Inc.; "HARQ-ACK feedback"; 3GPP TSG RAN WG1 NR Ad-Hoc#3, R1-1716105; Nagoya, Japan; Sep. 18-21, 2017 (11 pages).
Wilus Inc.; "Discussion on UCI multiplexing for NR"; 3GPP TSG RAN WG1 Meeting NR#3, R1-1716633; Nagoya, Japan; Sep. 18-21, 2017 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in counterpart European Patent Application No. 17926508.7, dated Apr. 9, 2021 (8 pages).
Sharp; "UCI reporting on PUCCH and PUSCH"; 3GPP TSG RAN WG1 Meeting #89, R1-1708374; Hangzhou, P.R. China; May 15-19, 2017 (3 pages).
Office Action issued in the counterpart Indonesian Patent Application No. P00202003108, dated Sep. 8, 2021 (10 pages).
Office Action issued in the counterpart Japanese Patent Application No. 2019-544167, dated Nov. 24, 2021 (4 pages).
NTT Docomo, Inc.; "UCI multiplexing"; TSG RAN WG1 NR Ad-Hoc#3, R1-1716102; Nagoya, Japan, Sep. 18-21, 2017 (5 pages).
Sharp; "Simultaneous PUCCH and PUSCH transmission and collision handling"; 3GPP TSG RAN WG1 Meeting NR#3, R1-1716272; Nagoya, Japan, Sep. 18-21, 2017 (2 pages).

\* cited by examiner

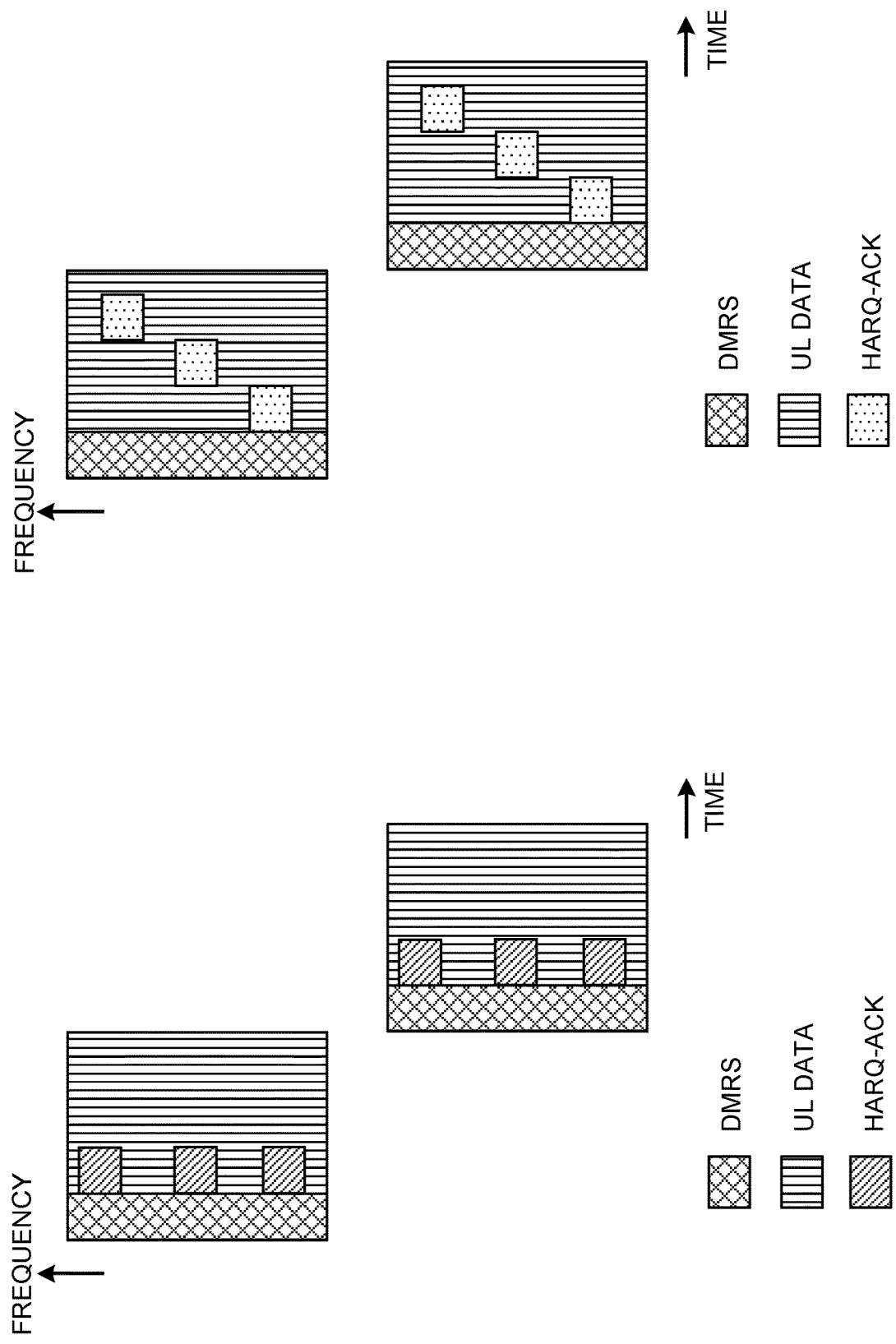

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of wider bands and a higher speed than those of LTE, LTE successor systems (also referred to as, for example, LTE Advanced (LTE-A), Future Radio Access (FRA), 4G, 5G, 5G+ (plus), New RAT (NR), and LTE Rel. 14 and 15~) have been also studied.

Uplink (UL) of legacy LTE systems (e.g., LTE Rel. 8 to 13) support a DFT-spread-OFDM (DFT-s-OFDM: Discrete Fourier Transform-Spread-Orthogonal Frequency Division Multiplexing) waveform. The DFT-spread-OFDM waveform is a single carrier waveform, and consequently can prevent an increase in a Peak to Average Power Ratio (PAPR).

Furthermore, in the legacy LTE systems (e.g., LTE Rel. 8 to 13), the user terminal transmits Uplink Control Information (UCI) by using a UL data channel (e.g., PUSCH: Physical Uplink Shared Channel) and/or a UL control channel (e.g., PUCCH: Physical Uplink Control Channel).

Transmission of the UCI is controlled based on whether or not simultaneous PUSCH and PUCCH transmission is configured, and whether or not the PUSCH is scheduled in a TTI for transmitting the UCI. Transmitting UCI by using a PUSCH will be also referred to as UCI on PUSCH.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It has been studied for a future radio communication system (e.g., LTE Rel. 14 or subsequent releases, 5G or NR) to flexibly control scheduling of a data channel (also referred to simply as, for example, data including a DL data channel and/or a UL data channel). For example, it has been studied to make a transmission timing and/or a transmission duration (also referred to as a "transmission timing/transmission duration" below) of data changeable (variable length) per scheduling. Furthermore, it has been studied to make a transmission acknowledgement signal (also referred to as HARQ-ACK, ACK/NACK and A/N) for data transmission changeable per transmission, too.

When transmission of uplink data (e.g., UL data) and a transmission timing of Uplink Control Information (UCI) overlap, the legacy LTE systems transmit the UL data and the UCI by using an uplink shared channel (PUSCH) (UCI on PUSCH). It is considered that a future radio communication system also transmits UL data and UCI (e.g., A/N) by using a PUSCH similar to the legacy LTE systems.

However, when UL data and UCI are transmitted by using a PUSCH in a case where a transmission timing of UCI for data is variable, study on what kind of transmission processing needs to be performed on the UL data and the UCI has not yet developed. When the same transmission processing as those of the legacy LTE systems is applied, there is a risk that communication quality deteriorates.

The present invention has been made in light of this point, and one of objects of the present invention is to provide a user terminal and a radio communication method that can prevent deterioration of communication quality even when uplink data and uplink control information are transmitted by using an uplink shared channel in a future radio communication system.

Solution to Problem

One aspect of a user terminal according to the present invention includes: a transmission section that transmits an uplink shared channel over multiple slots based on an instruction from a base station; and a control section that performs control to multiplex uplink control information on the uplink shared channel in at least one slot of the plurality of slots to transmit.

Advantageous Effects of Invention

According to the present invention, it is possible to prevent deterioration of communication quality even when uplink data and uplink control information are transmitted by using an uplink shared channel in a future radio communication system.

BRIEF DESCRIPTION OF DRAWINGS

FIGS. 4A and 4B are diagrams illustrating one example of a rate matching pattern and a puncture pattern in a case where frequency hopping is applied to a PUSCH.

DESCRIPTION OF EMBODIMENTS

It has been studied for a future radio communication system (e.g., LTE Rel. 14 or subsequent releases, 5G or NR) to use a time unit (e.g., at least one of a slot, a mini slot or a given number of symbols) whose time duration is changeable as a scheduling unit of a data channel (also referred to simply as, for example, data including a DL data channel and/or a UL data channel).

In this regard, the slot is a time unit based on numerologies (e.g., a subcarrier-spacing and/or a symbol length) applied by a user terminal. The number of symbols per slot may be defined according to the subcarrier-spacing. When, for example, the subcarrier-spacing is 15 kHz or 30 kHz, the number of symbols per slot may be 7 or 14 symbols. On the other hand, when the subcarrier-spacing is 60 kHz or more, the number of symbols per slot may be 14 symbols.

The subcarrier-spacing and a symbol length have a relationship of a reciprocal. Hence, when the number of symbols per slot is identical, as the subcarrier-spacing is higher (wider), the slot length is shorter. On the other hand, as the subcarrier-spacing is lower (narrower), the slot length is longer.

Furthermore, the mini slot is a time unit shorter than the slot. The mini slot may include a smaller number of symbols (e.g., 1 to (slot length-1) symbols such as 2 or 3 symbols in one example) than that of the slot. numerologies (e.g., a subcarrier-spacing and/or a symbol length) identical to those of the slot may be applied to the mini slot in the slot, or numerologies (e.g., a subcarrier-spacing higher than that of the slot and/or a symbol length shorter than that of the slot) different from those of the slot may be applied.

The future radio communication system is assumed to control transmission and reception (or, for example, allocation) of a signal and/or a channel by applying a plurality of time units to scheduling of, for example, data as different time units from those of the legacy LTE systems are introduced. It is supposed that, when scheduling of, for example, data is performed by using the different time units, there are, for example, pluralities of data transmission durations and/or transmission timings. For example, the user terminal that supports a plurality of time units transmits and receives data to be scheduled in the different time units.

In one example, it is considered to apply scheduling (slot-based scheduling) in a first time unit (e.g., a slot unit), and scheduling (non-slot-based scheduling) in a second time unit (e.g., a non-slot unit) shorter than the first time unit. The non-slot unit may be a mini slot unit or a symbol unit. In addition, the slot can include, for example, 7 symbols or 14 symbols, and the mini slot can include 1 to (slot length-1) symbols.

Figure 1:
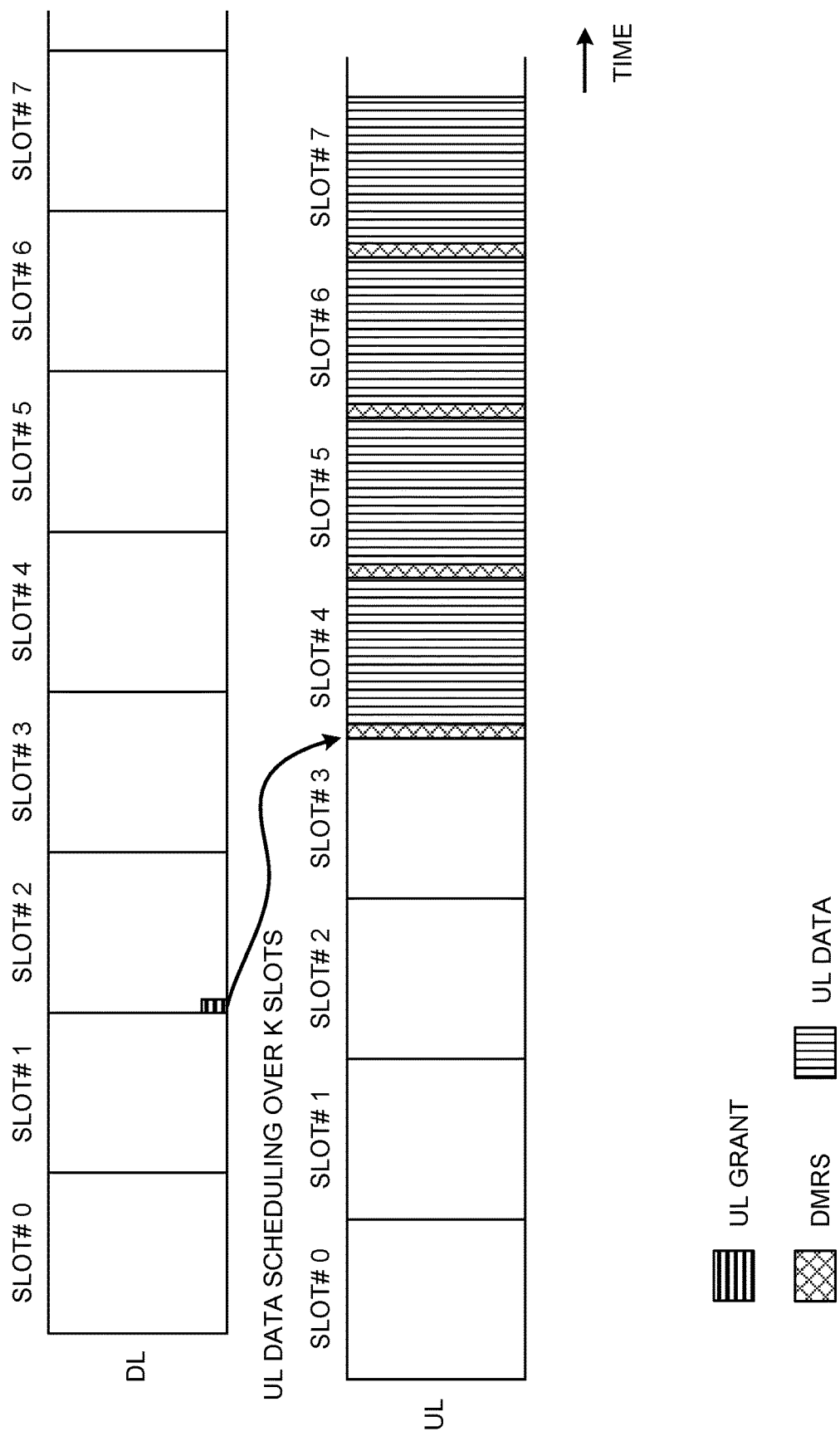
FIG. 1 is a diagram illustrating one example of a case where multi-slot scheduling is applied to a PUSCH.

Furthermore, it has been studied to flexibly control a data transmission timing/transmission duration in a time direction according to a data scheduling unit. In a case where, for example, slot-based scheduling is performed, a configuration to allocate a PUSCH to multiple slots is also considered in addition to a configuration to allocate one data (e.g., PUSCH) to 1 slot (see FIG. 1). The configuration to allocate the PUSCH to multiple slots will be referred to as multi-slot scheduling of the PUSCH. FIG. 1 illustrates a case where the PUSCH is scheduled over K slots.

Similar to data (e.g., a PDSCH and/or a PUSCH) whose transmission timing/transmission duration are variably controlled, UCI (e.g., A/N) for the data is also assumed to be configured to make a transmission timing/transmission duration changeable per transmission. For example, a base station indicates the transmission timing/transmission duration of the UCI to a UE by using, for example, downlink control information and/or a higher layer signaling. In this case, an A/N feedback timing is flexibly configured in a duration subsequent to downlink control information and/or a corresponding PDSCH for notifying a transmission timing/transmission duration of this A/N.

Thus, the future radio communication system is assumed to flexibly configure one or both of the transmission timing/transmission duration of A/N for DL data and the transmission timing/transmission duration of the PUSCH. On the other hand, UL transmission is requested to achieve a low Peak-to-Average Power Ratio (PAPR) and/or low Inter-Modulation Distortion (IMD), too.

As a method for achieving the low PAPR and/or the low IMB during UL transmission, there is a method (also referred to as UCI piggyback on PUSCH or UCI on PUSCH) for multiplexing UCI and UL data on a PUSCH to transmit when UCI transmission and UL data (UL-SCH) transmission occur at the same timing.

It is considered that the future radio communication system also performs UCI on PUSCH similar to legacy LTE systems. However, in a case where allocation of a PUSCH is scheduled over multiple slots (multi-slot scheduling), a problem is how to control UCI multiplexing (e.g., UCI on PUSCH). In this case, there is a risk that application of UCI on PUSCH similar to the legacy LTE systems that assume that transmission timings/transmission durations of data and/or UCI are fixedly configured deteriorates communication quality.

Hence, the inventors of this application have conceived performing UCI on PUSCH by using part or all of slots of multiple slots when a PUSCH is scheduled to multiple slots (multi-slot scheduling is applied). For example, A/N for DL transmission transmitted in a given slot is transmitted by using a PUSCH of all slots or part of given slots of multiple slots to which the PUSCH is scheduled. Consequently, it is possible to appropriately support UCI on PUSCH during the multi-slot scheduling.

The present embodiment will be described in detail below. The following embodiment may be applied alone, or may be applied in combination. In addition, according to the present embodiment, the UCI includes at least one of a Scheduling Request (SR), transmission acknowledgement information (also referred to as, for example, HARQ-ACK: Hybrid Automatic Repeat reQuest-Acknowledge, ACK or Negative ACK (NACK) or A/N) for a DL data channel (e.g., PDSCH: Physical Downlink Shared Channel), Channel State Information (CSI) including a Channel Quality Indicator (CQI) and rank information (RI: Rank Indicator), beam index information (BI: Beam Index), and a Buffer Status Report (BSR).

The following description will describe a case where slot-based scheduling is performed as an example. However, the present embodiment is not limited to this. Even when other durations are used as transmission units, the present embodiment is applicable likewise.

(First Aspect)

The first aspect will describe a configuration where, when multi-slot scheduling is applied to a PUSCH, UCI (e.g., A/N for given DL data) is multiplexed on all slots to which the PUSCH is scheduled.

Figure 2:
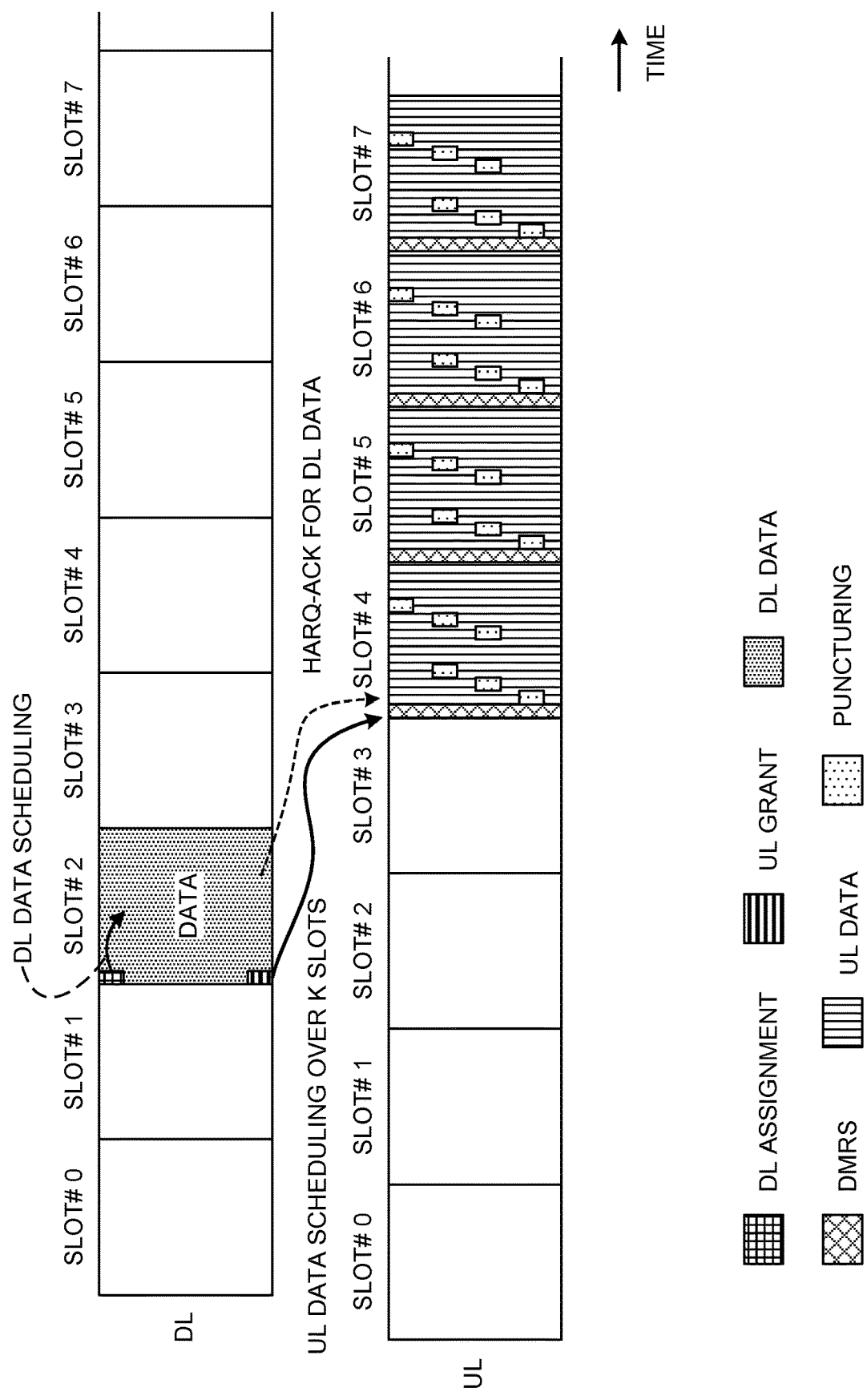
FIG. 2 is a diagram illustrating one example of UCI multiplexing in a case where multi-slot scheduling is applied to a PUSCH.

FIG. 2 illustrates one example of a UCI multiplexing method (UCI on PUSCH) in a case where a PUSCH is scheduled to K slots. The following description will describe a case of K=4, yet the value of K is not limited to this.

According to multi-slot scheduling of the PUSCH, a start position and an end position to which the PUSCH is scheduled (or allocated) may be notified to a UE by DCI. The DCI may be DCI (e.g., UL grant) for scheduling the PUSCH.

For example, a base station schedules the PUSCH and transmits, to a UE, information related to the start position and/or the end position to which the PUSCH is allocated by using the DCI. The start position and/or the end position may be information for specifying slot numbers. In, for example, FIG. 2, information related to a slot #4 corresponding to a PUSCH allocation start position, and a slot #7 corresponding to a PUSCH allocation end position is notified.

Multiple slots (K) to which the PUSCH is scheduled may be contiguous slots, or may be non-contiguous slots. Furthermore, downlink control information and a higher layer signaling may be combined to notify the UE of the information related to a duration (e.g., the start position and/or the end position) to which the PUSCH is allocated.

In FIG. 2, the PUSCH in slots #4 to #7 is scheduled based on DCI transmitted in a slot #2. Furthermore, UCI is multiplexed on the PUSCH in all slots (K slots) to which the PUSCH is scheduled.

The UE may respectively multiplex A/N for a DL signal transmitted in a given slot (e.g., the slot #2) on the PUSCH in the slots #4 to #7 to transmit. In this case, the A/N for the DL signal transmitted in 1 slot can be multiplexed over multiple slots and transmitted, so that it is possible to improve received quality of the A/N by, for example, repeated transmission.

Alternatively, when A/N for DL data respectively transmitted in multiple slots is transmitted in the slots #4 to #7, the A/N for the DL data in each slot may be multiplexed on the PUSCH in respectively different slots. That is, the A/N for the DL data transmitted in the different slots may be respectively multiplexed on the slots #4 to #7.

<UCI Multiplexing Method>

A PUSCH (e.g., UL data) is subjected to rate matching processing and/or puncture processing based on a given condition to multiplex UCI in all slots (the slots #4 to #7 in FIG. 2) to which the PUSCH is scheduled. The given condition may be the number of bits of the UCI (e.g., A/N). Alternatively, one of the rate matching processing and the puncture processing may be selected based on a UCI type. One of the rate matching processing and the puncture processing may be selected based on an instruction from the base station.

Performing the puncture processing on data refers to performing encoding assuming that resources allocated for the data can be used (or without taking an unavailable resource amount into account), yet not mapping encoded symbols on resources (e.g., UCI resources) that cannot be actually used (i.e., keeping resources unused). A reception side does not use the encoded symbols of the punctured resources for decoding, so that it is possible to suppress deterioration of characteristics due to the puncturing.

Performing the rate matching processing on data refers to controlling the number of bits after encoding (encoded bits) by taking actually available radio resources into account. When the number of encoded bits is smaller than the number of bits that can be mapped on the actually available radio resources, at least part of the encoded bits may be repeated. When the number of encoded bits is larger than the number of bits that can be mapped, part of the encoded bits may be deleted.

For example, the UE applies the puncture processing when UCI (e.g., A/N) to be multiplexed is given bits or less, and applies the rate matching processing (or the rate matching processing and the puncture processing) when the UCI is larger than the given bits to control UCI multiplexing. The given bits may be, for example, 2 bits. Furthermore, the UE may independently control a processing method for UL data per slot based on the number of bits of A/N to be multiplexed per slot, or may make the processing method common between multiple slots.

Furthermore, when rate matching is applied, information for instructing a rate matching pattern may be notified from the base station to the UE. For example, the information for instructing the rate matching pattern may be included in DCI (e.g., UL grant) for scheduling a PUSCH, and notified to the UE. A mapping pattern of UCI in a case where puncturing is applied may be also configured to be notified to the UE likewise.

<Rate Matching Pattern>

Figure 3A:
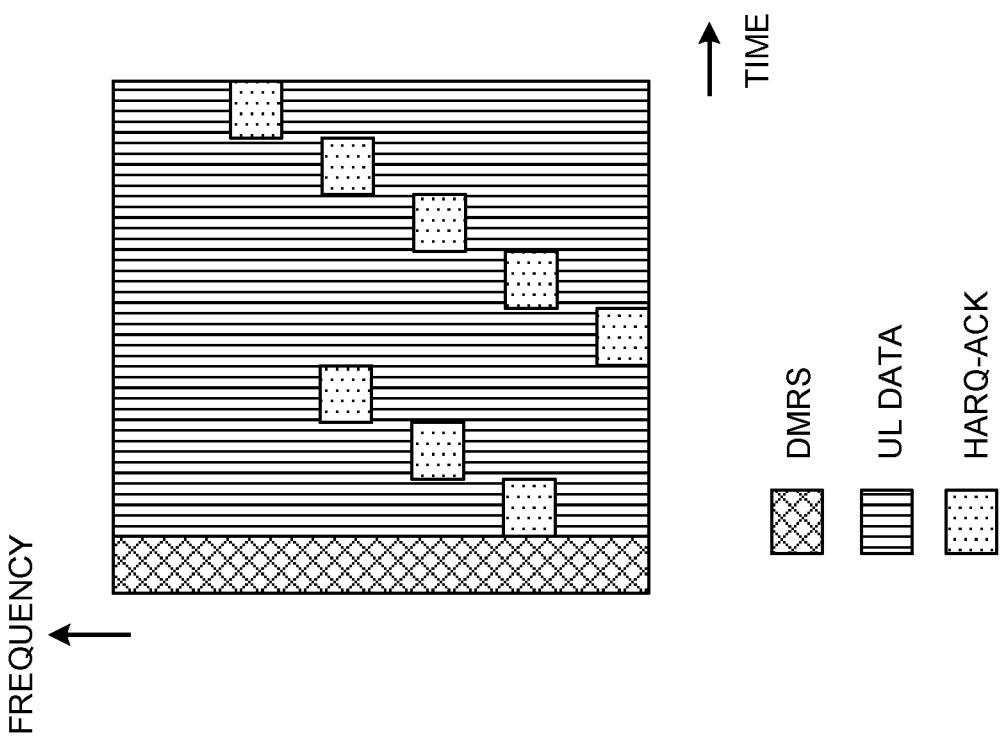
FIGS. 3A and 3B are diagrams illustrating a rate matching pattern and a puncture pattern.

FIG. 3A illustrates one example of a mapping pattern in a case where rate matching is applied. When the rate matching is applied, UCI is multiplexed in a proximity domain of a DMRS. The proximity domain of the DMRS indicates, for example, a domain including neighboring symbols of a symbol on which the DMRS is mapped.

In FIG. 3A, the DMRS is mapped on a head symbol (first symbol) of a slot, and therefore A/N only needs to be mapped in a domain including at least a second symbol. Furthermore, the A/N may be mapped so as to be dispersed in a frequency direction. By mapping the A/N in the proximity domain of the DMRS, it is possible to improve channel estimation accuracy that uses the DMRS.

In addition, FIG. 3A illustrates the case where the DMRS is arranged at a head of the slot. However, a DMRS position is not limited to this. When, for example, intra-slot Frequency Hopping (intra-slot FH) is applied to a PUSCH, DMRSs are mapped at heads of PUCCH domains before and after the hopping. In this case, a rate matching pattern may be configured such that A/N is multiplexed on the proximity domain of the DMRS of each PUCCH domain (see FIG. 4A).

<Puncture Pattern>

Figure 3B:
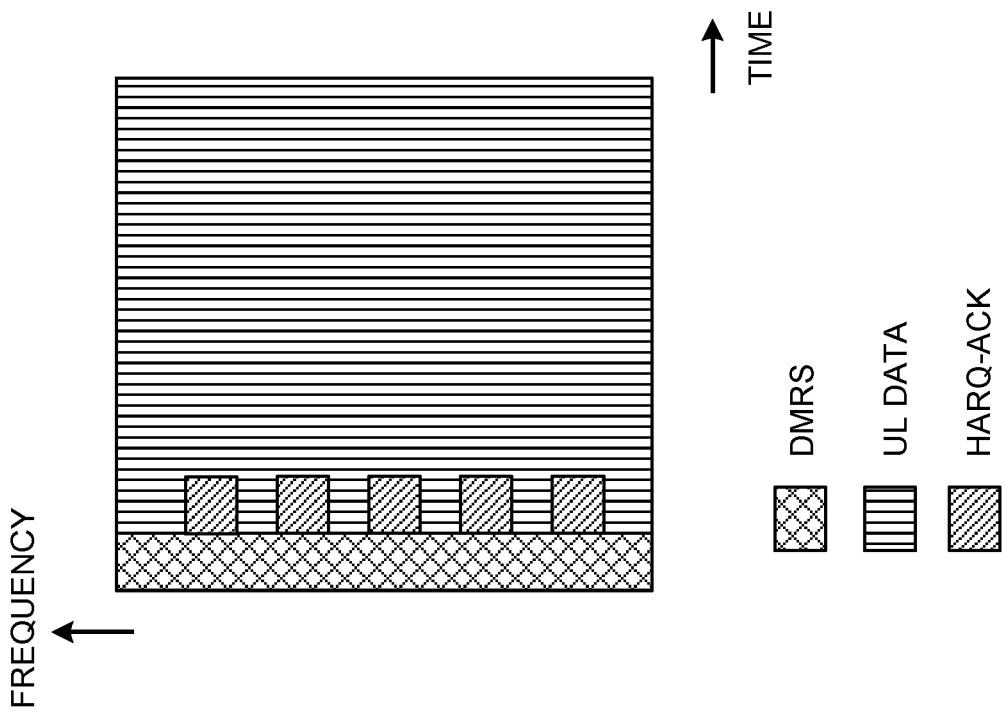

FIG. 3B illustrates one example of a mapping pattern in a case where puncturing is applied. When the puncturing is applied, UCI is multiplexed so as to be dispersed in the frequency and/or time directions in a PUSCH.

FIG. 3B illustrates a case where A/N is mapped so as to be dispersed in the frequency and time directions. By dispersing the A/N to be multiplexed on the PUSCH, it is possible to obtain frequency and/or time diversity gains for UCI. Furthermore, when UL data to be transmitted on the PUSCH includes a plurality of CBs, it is possible to disperse the number of pieces of UCI (the number of times of puncturing) to be multiplexed on each CB.

In addition, FIG. 3B illustrates the case where a DMRS is arranged at a head of a slot. However, a DMRS position is not limited to this. When, for example, intra-slot Frequency Hopping (intra-slot FH) is applied to a PUSCH, DMRSs are respectively mapped at heads of PUCCH domains before and after the hopping. In this case, a puncturing pattern may be configured such that A/N is dispersed and multiplexed in the frequency and/or time directions in each PUSCH domain (see FIG. 4B).

(Second Aspect)

The second aspect will describe a configuration where, when multi-slot scheduling is applied to a PUSCH, UCI (e.g., A/N for given DL data) is multiplexed on a slot that is part of slots to which the PUSCH is scheduled.

Figure 5:
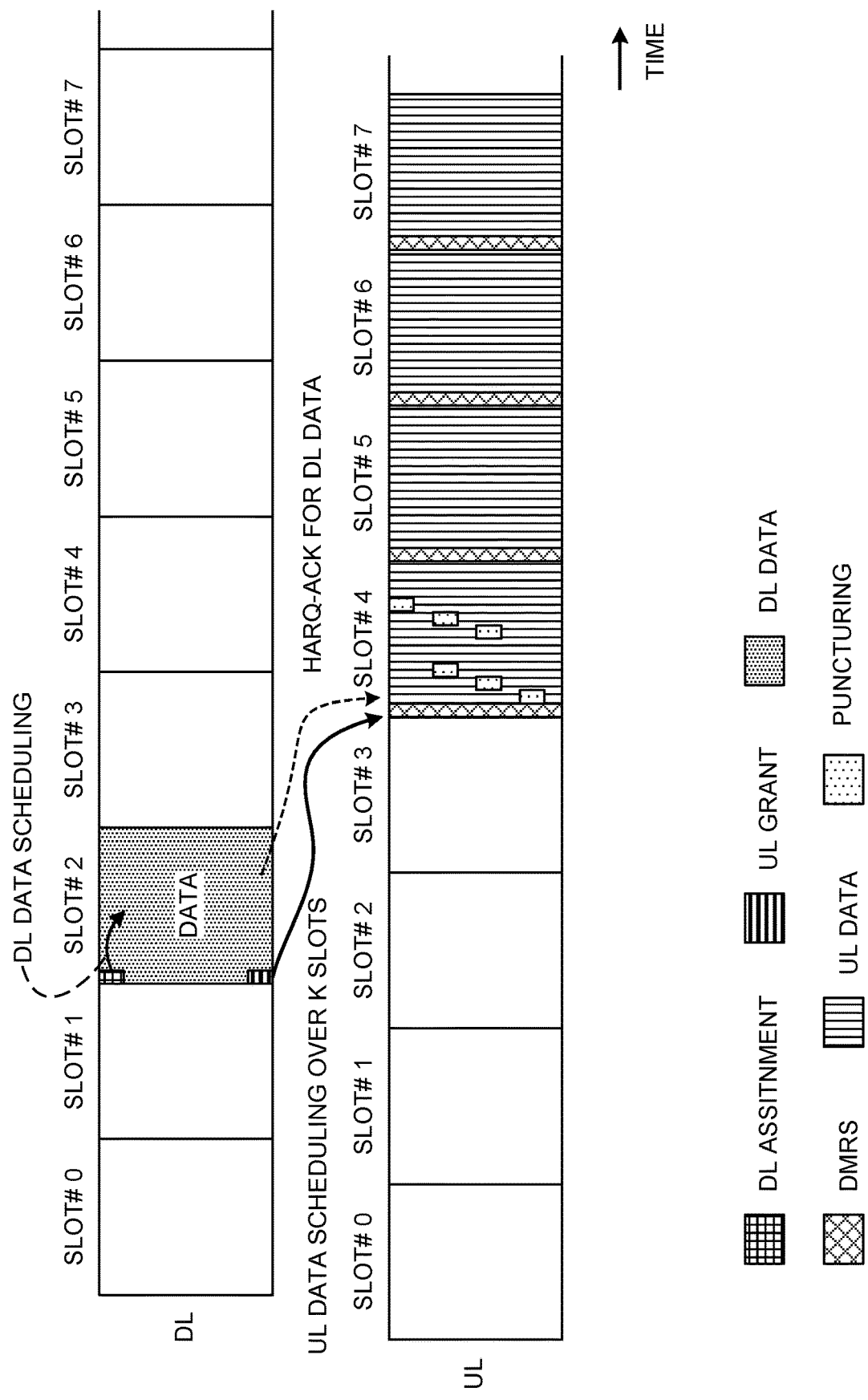
FIG. 5 is a diagram illustrating another example of UCI multiplexing in a case where multi-slot scheduling is applied to a PUSCH.

FIG. 5 illustrates one example of a UCI multiplexing method (UCI on PUSCH) in a case where a PUSCH is scheduled to K (K=4 in this case) slots. FIG. 5 illustrates a case where A/N for DL data transmitted in a given slot (a slot #2 in this case) is transmitted in a slot (a slot #4 in this case) that is part of slots #4 to #7 to which the PUSCH is scheduled.

According to multi-slot scheduling of the PUSCH, a start position and an end position to which the PUSCH is scheduled may be notified to a UE by, for example, DCI and/or a higher layer signaling.

For example, a base station schedules the PUSCH and transmits, to a UE, information related to the start position and/or the end position to which the PUSCH is allocated by using the DCI. The start position and/or the end position may be information for specifying slot numbers. In, for example, FIG. 5, information related to the slot #4 corresponding to a PUSCH allocation start position, and the slot #7 corresponding to a PUSCH allocation end position is notified.

Furthermore, the base station may notify the UE of information related to a transmission timing (e.g., slot) at which A/N for DL data transmitted in a given slot is multiplexed. For example, the base station includes information related to the slot on which the A/N is multiplexed, in DCI for scheduling a PDSCH associated with A/N to transmit. When receiving the DL data, the UE can decide the slot on which the A/N for the DL data is multiplexed, based on the information included in the DCI for scheduling the DL data.

The information related to the slot on which the A/N is multiplexed may be information that indicates a specific slot (e.g., 1 slot). Alternatively, the information related to the slot on which the A/N is multiplexed may be information that indicates a slot position that is a UCI multiplexing start position. In this case, the UE performs control to multiplex the UCI on the PUSCH in a slot subsequent to the indicated start slot.

In addition, FIG. 5 illustrates the case where the A/N is transmitted in the head slot #4 of the slots #4 to #7, yet transmission of A/N is not limited to this. For example, the UCI may be multiplexed on an intermediate slot (e.g., at least one of the slots #5 to #7) of multiple slots to which the PUSCH is scheduled.

Thus, by multiplexing UCI by using slots that are part of multiple slots to which a PUSCH is scheduled, UCI does not need to be transmitted from a head slot. Consequently, it is possible to reserve a time for UCI generating processing. For example, the UE can use the PUSCH to transmit UCI, too, that cannot be generated by a start timing (head slot) to which the PUSCH is scheduled. Consequently, even the UE whose UCI processing capability is low can transmit A/N by using the PUSCH.

In addition, FIG. 5 illustrates the case where the DCI for scheduling the PUSCH, and the DL data associated with the A/N to be transmitted by using the PUSCH are transmitted in the same slot. However, the present embodiment is not limited to this.

Figure 6:
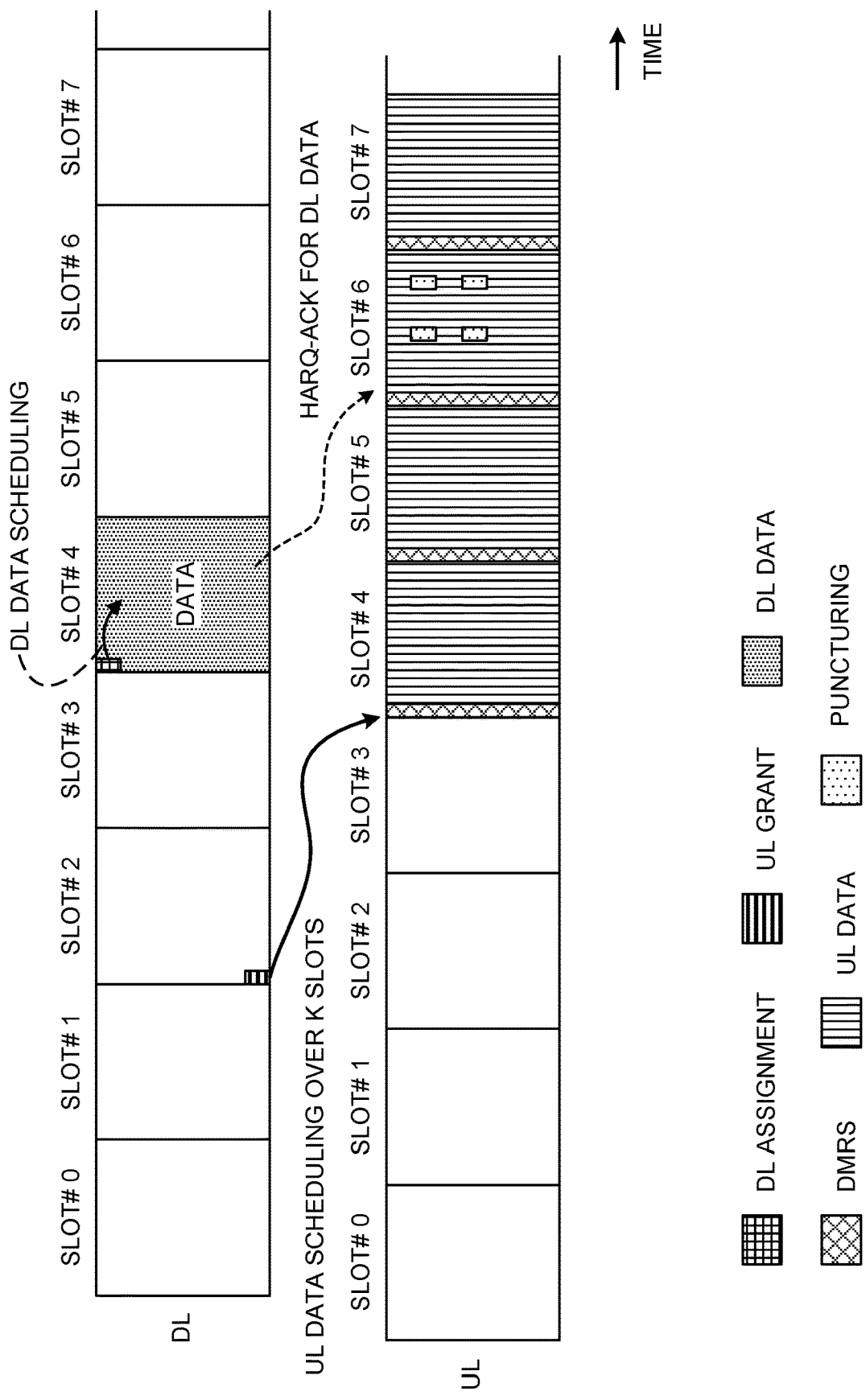
FIG. 6 is a diagram illustrating another example of UCI multiplexing in a case where multi-slot scheduling is applied to a PUSCH.
Figure 7:
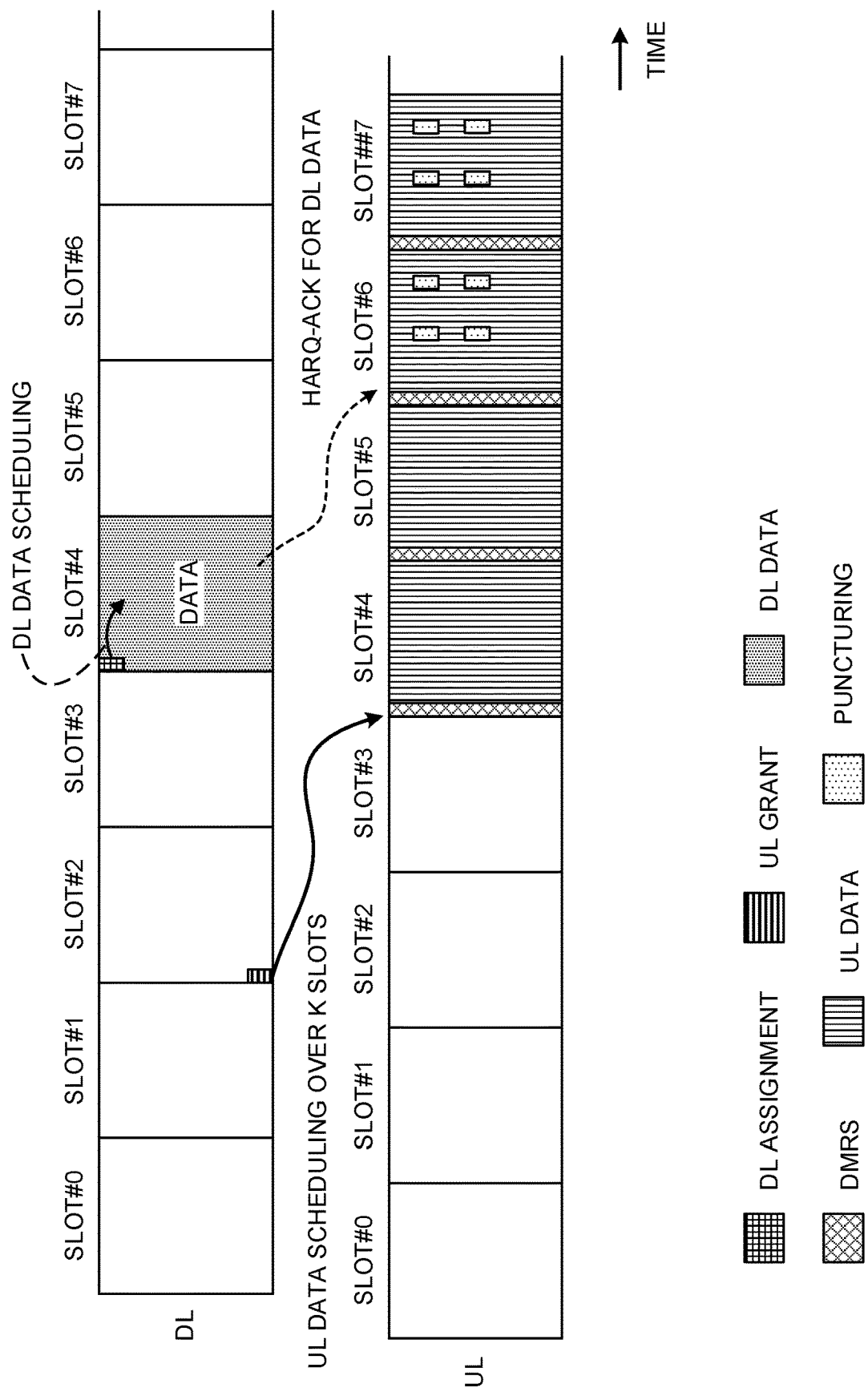
FIG. 7 is a diagram illustrating another example of UCI multiplexing in a case where multi-slot scheduling is applied to a PUSCH.

FIGS. 6 and 7 illustrate cases where A/N for DL data transmitted in the slot #4 after the slot #2 in which DCI (UL grant) for scheduling a PUSCH is transmitted is multiplexed on part of slots to which the PUSCH is scheduled.

FIG. 6 illustrates a case where the A/N for the DL data transmitted in the slot #4 is multiplexed on the one slot #6 of multiple slots #4 to #7 to which the PUSCH is scheduled. For example, the base station includes information (information that indicates the slot #6 in this case) related to a slot on which the A/N for the DL data is multiplexed, in the DCI for scheduling the DL data to notify the UE. The UE multiplexes the A/N on the PUSCH of a given slot based on the information included in the DCI for scheduling the DL data.

FIG. 7 illustrates the case where the A/N for the DL data transmitted in the slot #4 is multiplexed on slots (slots #6 and #7) subsequent to the given slot #6 of multiple slots to which the PUSCH is scheduled. For example, the base station includes information (information that indicates the slot #6 as a start slot in this case) related to a start slot on which the A/N for the DL data is multiplexed, in the DCI for scheduling the DL data to notify the UE. The UE multiplexes the A/N on the PUSCH subsequent to the given slot based on the information included in the DCI for scheduling the DL data.

Thus, by using the PUSCH to transmit the A/N for the DL data, too, that is transmitted after a transmission timing of the DCI for scheduling the PUSCH, it is possible to flexibly configure transmission of the A/N according to, for example, a scheduling duration of the PUSCH.

<HARQ-ACK Window>

Furthermore, in a duration (e.g., multiple slots) to which a PUSCH is scheduled, a candidate duration for performing transmission of A/N for DL data transmitted in each slot may be configured to control A/N transmission. The candidate duration for performing the A/N transmission may be referred to as a window, a time window, an HARQ-ACK window or an A/N feedback window.

Figure 8:
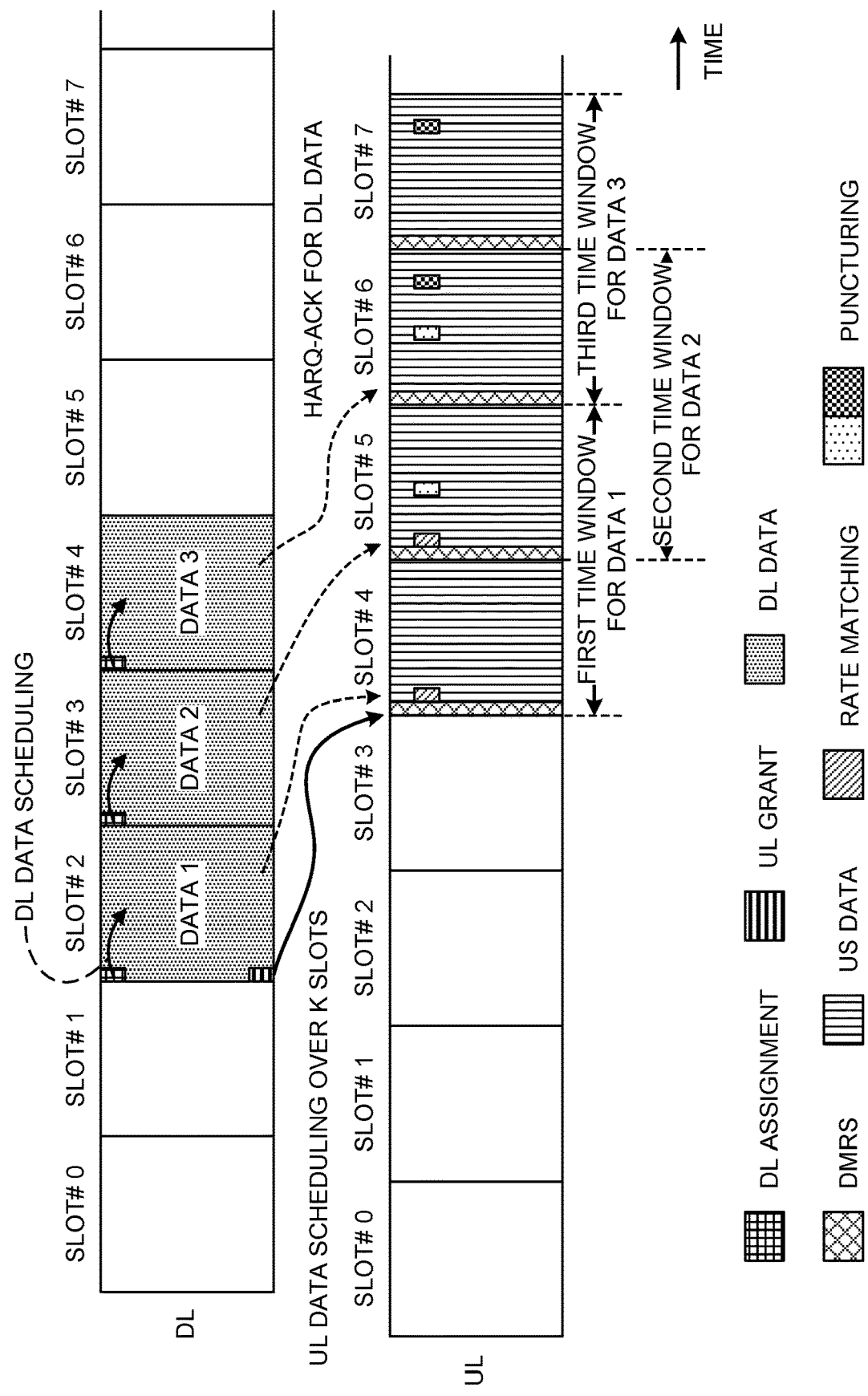
FIG. 8 is a diagram illustrating another example of UCI multiplexing in a case where multi-slot scheduling is applied to a PUSCH.

FIG. 8 illustrates a case where each time window (HARQ-ACK window) is configured to A/N for DL data transmitted in a different slot. The time window only needs to be configured to include a slot that is part of multiple slots to which the PUSCH is scheduled.

In FIG. 8, a first window is configured to first DL data (or A/N associated with the first DL data) transmitted in the slot #2. Similarly, a second window is configured to second DL data transmitted in the slot #3, and a third window is configured to third DL data transmitted in the slot #4.

The case where a time window size (e.g., the number of slots) configured in association with each DL data is a common value (2 in this case) has been described, yet the time window size is not limited to this. For example, the time window size associated with each DL data and/or the start timing (a duration from DL transmission to A/N start) may be respectively differently (independently) configured.

A configuration (e.g., a size and/or a start timing) of the time window for each data may be defined in advance by a specification, or may be notified from the base station to the UE. For example, the base station may include configuration information of a window associated with DL data in DCI for scheduling the DL data to notify the UE.

The UE controls an A/N transmitting timing based on the DCI for scheduling DL data when receiving the DL data. In this regard, the UE may transmit the A/N in all slots included in the configured time windows, or may transmit the A/N in part of slots.

By permitting transmission of the A/N in part of the slots, it is possible to flexibly control the A/N transmission timing according to UE processing capability (e.g., A/N generating processing capability). Furthermore, by configuring each time window to each DL data, it is possible to disperse and multiplex the A/N for each DL data in multiple slots to which the PUSCH is scheduled.

<UCI Multiplexing Method>

In part of slots (the slots #4 to #7 in FIG. 5) to which a PUSCH is scheduled, rate matching processing and/or puncture processing are performed on the PUSCH (e.g., UL data) based on a given condition to multiplex UCI. The given condition may be the number of bits of the UCI (e.g., A/N). Alternatively, one of the rate matching processing and the puncture processing may be selected based on a UCI type. One of the rate matching processing and the puncture processing may be selected based on an instruction from a base station.

Furthermore, contents described in the above first aspect may be applied to a specific UCI multiplexing method, rate matching pattern and puncture pattern.

(Radio Communication System)

The configuration of the radio communication system according to one embodiment of the present invention will be described below. This radio communication system uses one or a combination of the radio communication method according to each of the above embodiment of the present invention to perform communication.

Figure 9:
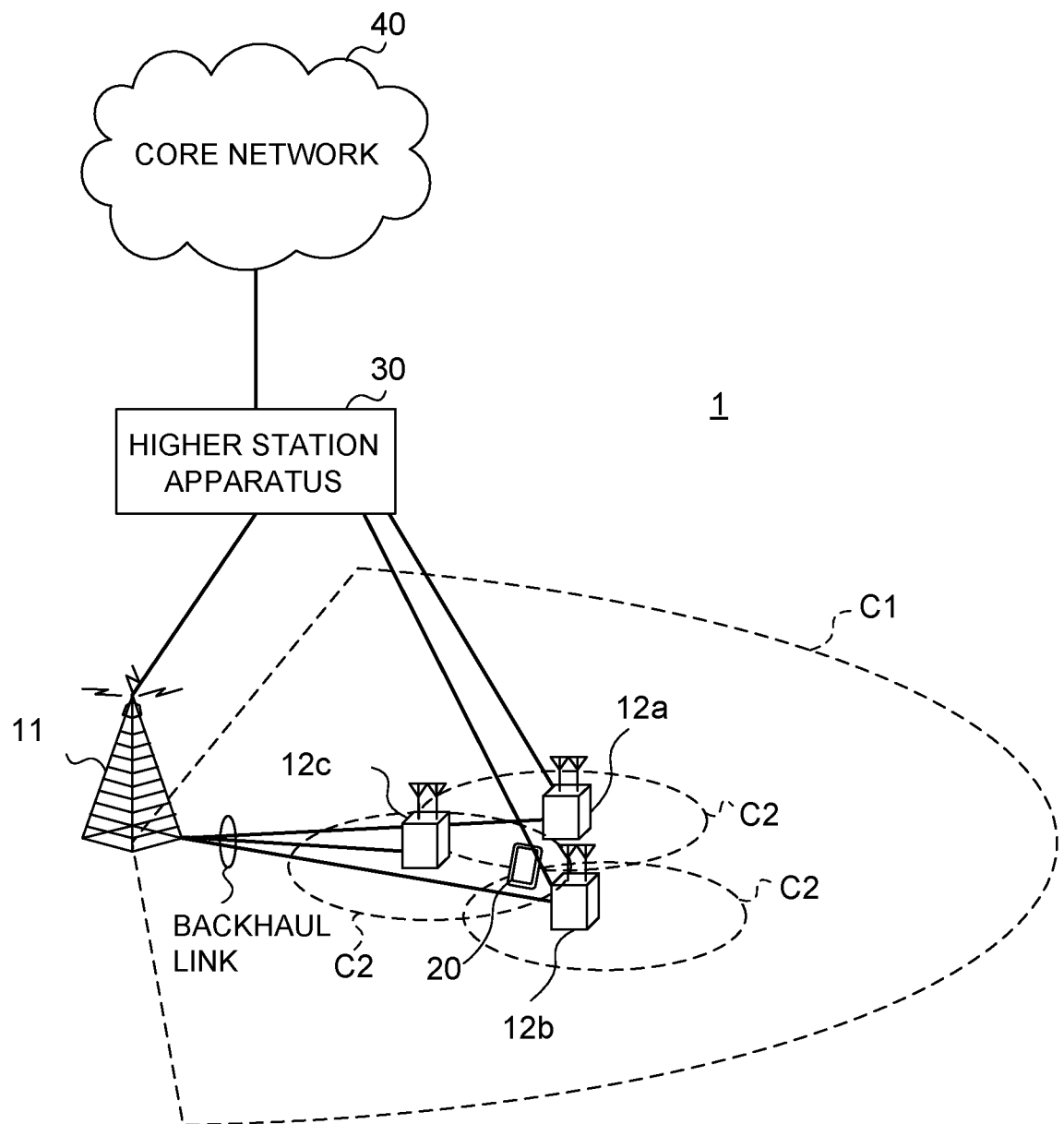
FIG. 9 is a diagram illustrating one example of a schematic configuration of a radio communication system according to the present embodiment.

FIG. 9 is a diagram illustrating one example of a schematic configuration of the radio communication system according to the one embodiment of the present invention. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT) and New Radio (NR), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement of respective cells and the user terminals 20 are not limited to those illustrated in FIG. 9.

The user terminal 20 can connect with both of the radio base station 11 and the radio base stations 12. The user terminal 20 is assumed to concurrently use the macro cell C1 and the small cells C2 by CA or DC. Furthermore, the user terminal 20 can apply CA or DC by using a plurality of cells (CCs) (e.g., five CCs or less or six CCs or more).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and applies Single Carrier-Frequency Division Multiple Access (SC-FDMA) to uplink as radio access schemes. OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these, and other radio access schemes may be used.

The radio communication system 1 may be configured to apply different numerologies in a cell and/or between cells. In this regard, the numerologies refer to, for example, communication parameters (e.g., a subcarrier-spacing and a bandwidth) to be applied to transmission and reception of a certain signal.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and System Information Blocks (SIBs) are conveyed on the PDSCH. Furthermore, Master Information Blocks (MIBs) are conveyed on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and the PUSCH is conveyed on the PDCCH. The number of OFDM symbols used for the PDCCH is conveyed on the PCFICH. Transmission acknowledgement information (also referred to as, for example, retransmission control information, HARQ-ACK or ACK/NACK) of a Hybrid Automatic Repeat reQuest (HARD) for the PUSCH is conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are conveyed on the PUSCH. Furthermore, downlink radio quality information (CQI: Channel Quality Indicator) and transmission acknowledgement information are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UE-specific Reference Signal). Furthermore, a reference signal to be conveyed is not limited to these.

(Radio Base Station)

Figure 10:
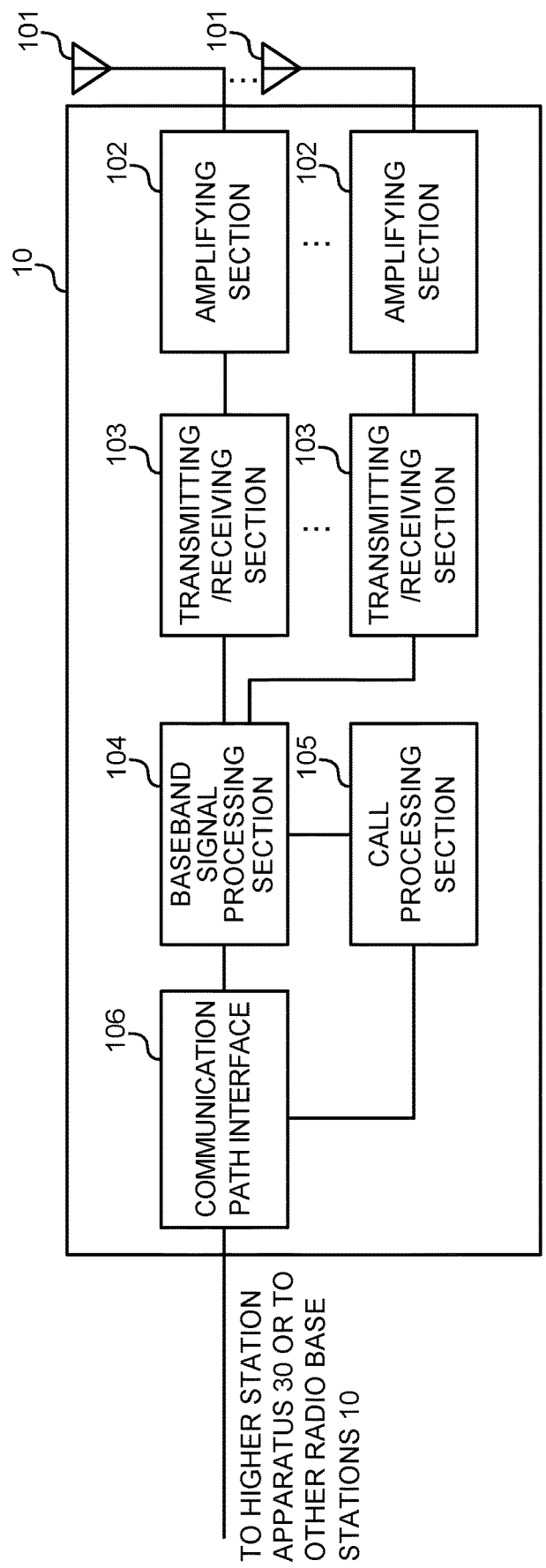
FIG. 10 is a diagram illustrating one example of an overall configuration of a radio base station according to the present embodiment.

FIG. 10 is a diagram illustrating one example of an overall configuration of the radio base station according to the one embodiment of the present invention. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmission/reception section 103. Furthermore, the baseband signal processing section 104 performs transmission processing such as channel coding and inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency range, and transmits a radio frequency signal. The radio frequency signal subjected to frequency conversion by each transmission/reception section 103 is amplified by each amplifying section 102, and is transmitted from each transmission/reception antenna 101. The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

Meanwhile, each amplifying section 102 amplifies a radio frequency signal received by each transmission/reception antenna 101 as an uplink signal. Each transmission/reception section 103 receives the uplink signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, MAC retransmission control reception processing, and reception processing of an RLC layer and a PDCP layer on user data included in the input uplink signal, and transfers the user data to the higher station apparatus 30 via the channel interface 106. The call processing section 105 performs call processing (such as configuration and release) of a communication channel, state management of the radio base station 10, and radio resource management.

The channel interface 106 transmits and receives signals to and from the higher station apparatus 30 via a given interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

Each transmission/reception section 103 transmits DL data, DCI for scheduling the DL data and DCI for scheduling UL data respectively in given slots. Furthermore, when a PUSCH is scheduled over multiple slots, information for specifying a start position (e.g., start slot) and/or an end position (e.g., end slot) to which the PUSCH is scheduled may be transmitted to the UE.

Furthermore, each transmission/reception section 103 may notify the UE of information related to a transmission timing of A/N for each DL data. Furthermore, when an HARQ-ACK window is configured per DL data, each transmission/reception section 103 may notify the UE of information related to the HARQ-ACK window.

Figure 11:
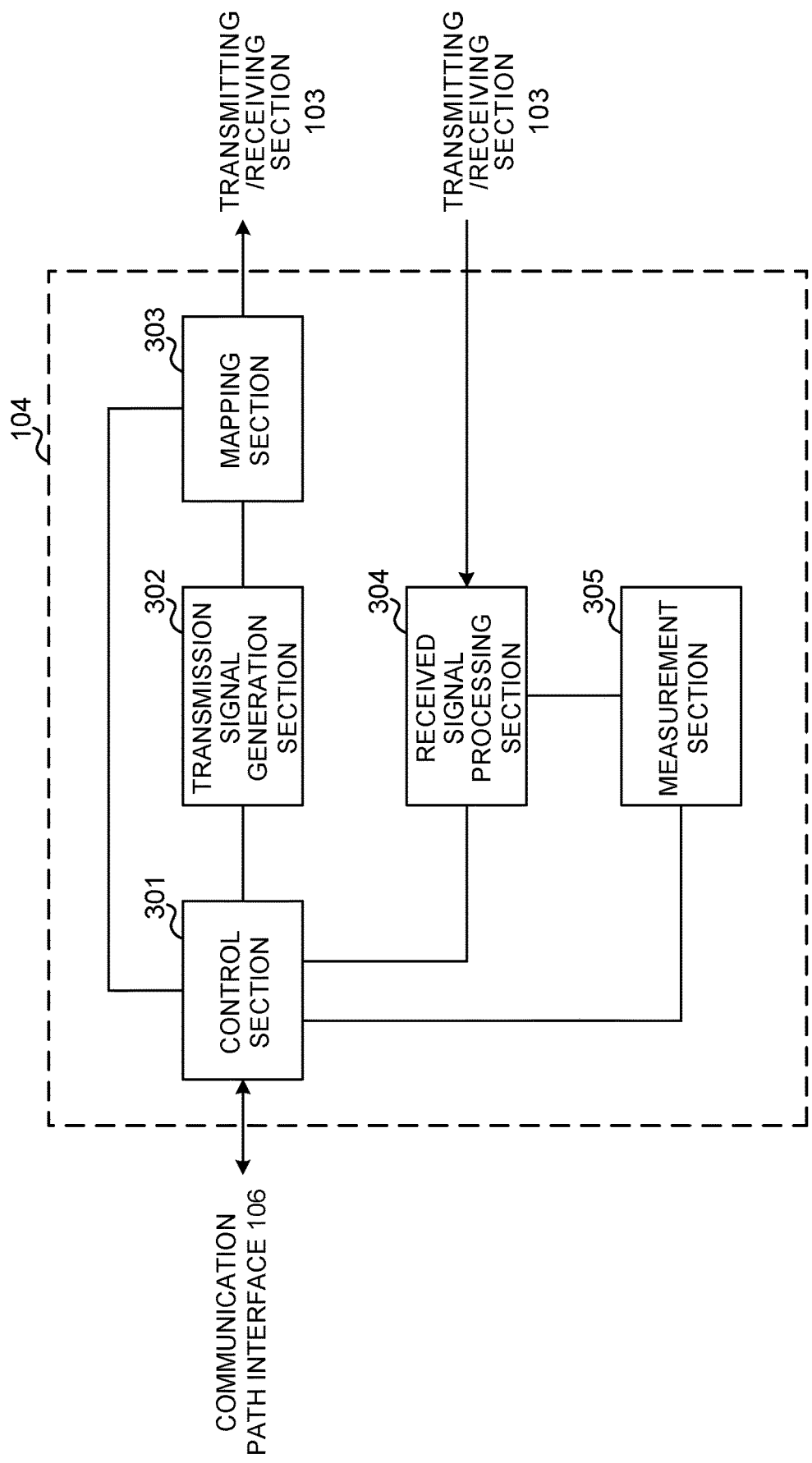
FIG. 11 is a diagram illustrating one example of a function configuration of the radio base station according to the present embodiment.

FIG. 11 is a diagram illustrating one example of a function configuration of the radio base station according to the one embodiment of the present invention. In addition, this example mainly illustrates function blocks of characteristic portions according to the present embodiment, and assumes that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present invention.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal that is transmitted on the PDSCH), and a downlink control signal (e.g., a signal that is transmitted on the PDCCH, an EPDCCH or an NR-PDCCH). Furthermore, the control section 301 controls generation of a downlink control signal (e.g., transmission acknowledgement information) and a downlink data signal based on a result obtained by deciding whether or not it is necessary to perform retransmission control on an uplink data signal. Furthermore, the control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

Furthermore, the control section 301 controls scheduling of an uplink data signal (e.g., a signal that is transmitted on the PUSCH), an uplink control signal (e.g., a signal that is transmitted on the PUCCH and/or the PUSCH), a random access preamble that is transmitted on the PRACH and an uplink reference signal.

The control section 301 may control scheduling of the PUSCH over multiple slots. In this case, the control section 301 performs control to notify the UE of the start position (e.g., start slot) and/or the end position (e.g., end slot) to which the PUSCH is scheduled.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present invention.

The transmission signal generating section 302 generates, for example, a DL assignment for notifying downlink signal allocation information, and a UL grant for notifying uplink signal allocation information based on the instruction from the control section 301. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on the above given radio resources based on the instruction from the control section 301, and outputs the downlink signal to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmission/reception section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

The measurement section 305 may measure received power (e.g., Reference Signal Received Power (RSRP)), received quality (e.g., Reference Signal Received Quality (RSRQ) or a Signal to Interference plus Noise Ratio (SINR)), or uplink channel information (e.g., CSI) of a received signal. The measurement section 305 may output a measurement result to the control section 301.

(User Terminal)

Figure 12:
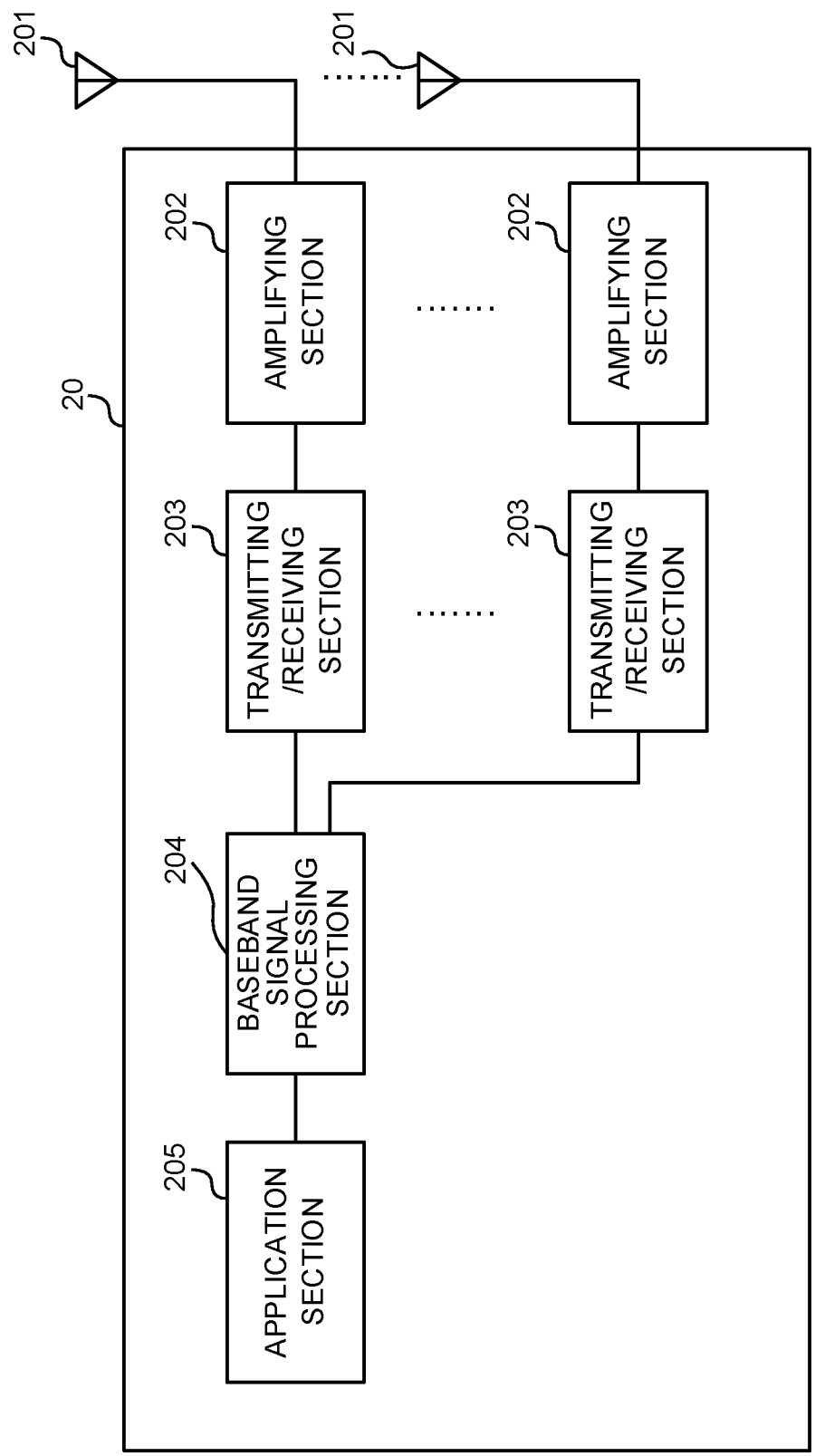
FIG. 12 is a diagram illustrating one example of an overall configuration of a user terminal according to the present embodiment.

FIG. 12 is a diagram illustrating one example of an overall configuration of the user terminal according to the one embodiment of the present invention. The user terminal 20 includes pluralities of transmission/reception antennas 201, amplifying sections 202 and transmission/reception sections 203, a baseband signal processing section 204 and an application section 205. In this regard, the user terminal 20 only needs to be configured to include one or more of each of the transmission/reception antennas 201, the amplifying sections 202 and the transmission/reception sections 203.

Each amplifying section 202 amplifies a radio frequency signal received at each transmission/reception antenna 201. Each transmission/reception section 203 receives a downlink signal amplified by each amplifying section 202. Each transmission/reception section 203 performs frequency conversion on the received signal into a baseband signal, and outputs the baseband signal to the baseband signal processing section 204. The transmission/reception sections 203 can be composed of transmitters/receivers, transmission/reception circuits or transmission/reception apparatuses described based on the common knowledge in the technical field according to the present invention. In this regard, the transmission/reception sections 203 may be composed as an integrated transmission/reception section or may be composed of transmission sections and reception sections.

The baseband signal processing section 204 performs FFT processing, error correcting decoding, and retransmission control reception processing on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs retransmission control transmission processing (e.g., HARQ transmission processing), channel coding, precoding, Discrete Fourier Transform (DFT) processing and IFFT processing on the uplink user data, and transfers the uplink user data to each transmission/reception section 203. Each transmission/reception section 203 converts the baseband signal output from the baseband signal processing section 204 into a radio frequency range, and transmits a radio frequency signal. The radio frequency signal subjected to the frequency conversion by each transmission/reception section 203 is amplified by each amplifying section 202, and is transmitted from each transmission/reception antenna 201.

Each transmission/reception section 203 receives the DL data, the DCI for scheduling the DL data, and the DCI for scheduling the UL data respectively in the given slots. Furthermore, each transmission/reception section 203 transmits an uplink shared channel over multiple slots based on an instruction from the base station. Furthermore, when the PUSCH is scheduled over multiple slots, each transmission/reception section 203 may receive information for specifying the start position and/or the end position to which the PUSCH is scheduled.

Furthermore, each transmission/reception section 203 may receive information related to the transmission timing of the A/N for each DL data. Furthermore, when the HARQ-ACK window is configured per DL data, each transmission/reception section 203 may receive information related to the HARQ-ACK window.

Figure 13:
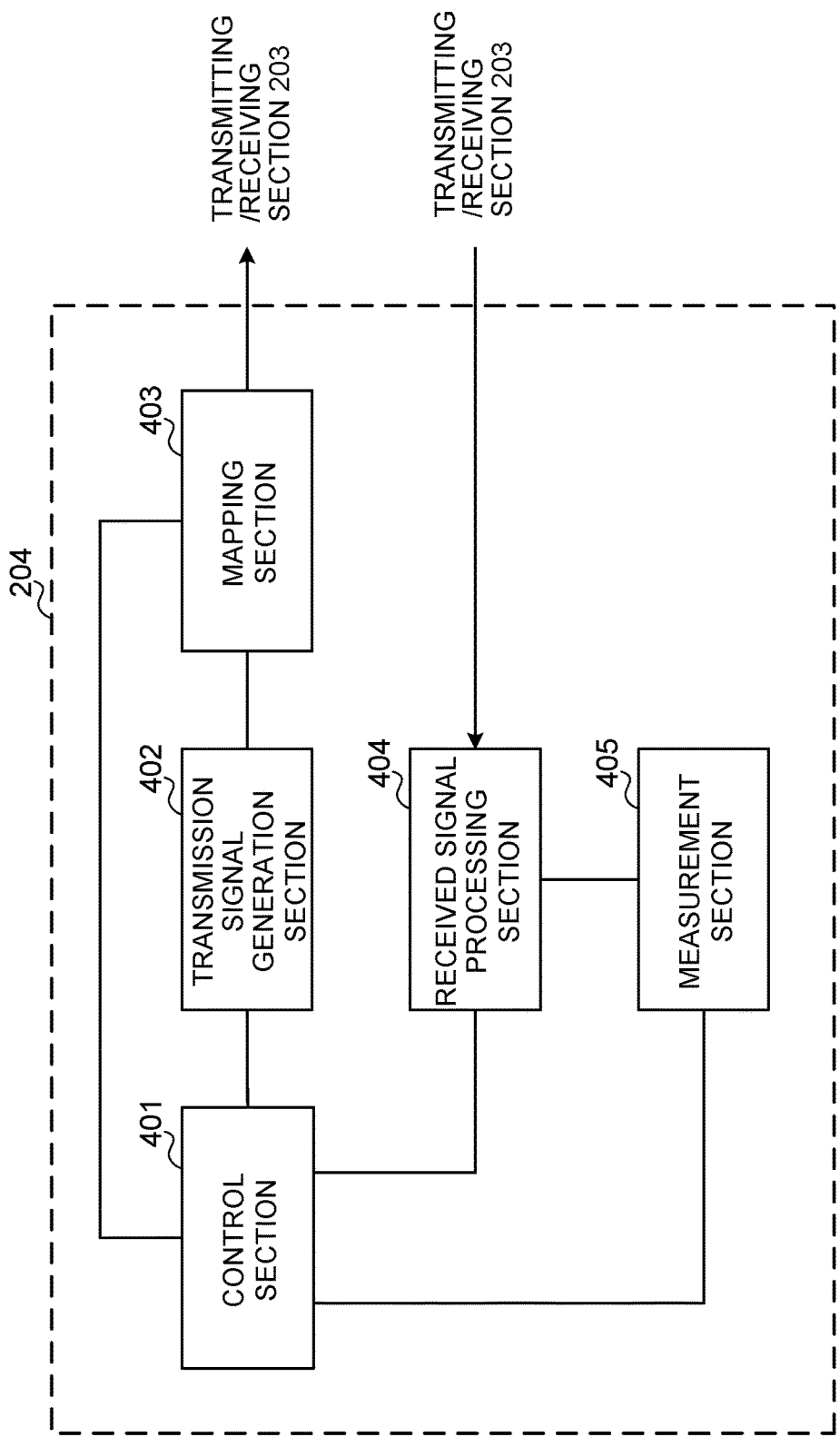
FIG. 13 is a diagram illustrating one example of a function configuration of the user terminal according to the present embodiment.

FIG. 13 is a diagram illustrating one example of a function configuration of the user terminal according to the one embodiment of the present invention. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal (e.g., a signal that has been transmitted on an NR-PDCCH) and a downlink data signal (a signal that has been transmitted on the PDSCH) that have been transmitted from the radio base station 10. The control section 401 controls generation of an uplink control signal (e.g., transmission acknowledgement information) and/or an uplink data signal based on a result obtained by deciding whether or not it is necessary to perform retransmission control on the downlink control signal and/or the downlink data signal.

The control section 401 performs control to multiplex uplink control information on the uplink shared channel in at least one slot of multiple slots to which the PUSCH is scheduled to transmit. For example, the control section 401 performs control to multiplex the transmission acknowledgement signal for the downlink data received in the given slot, on the uplink shared channel of all slots of multiple slots.

Alternatively, the control section 401 performs control to multiplex the transmission acknowledgement signal for the downlink data received in the given slot, on the uplink shared channel of a given slot of multiple slots indicated by the downlink control information for scheduling the downlink data. Alternatively, the control section 401 performs control to multiplex the transmission acknowledgement signal for the downlink data received per slot, on a given slot of multiple slots included in a time window configured per downlink data.

Furthermore, when the uplink control information is multiplexed on the uplink shared channel, the control section 401 may perform rate matching processing and/or puncture processing based on a given condition.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present invention.

The transmission signal generating section 402 generates an uplink control signal related to transmission acknowledgement information and Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on radio resources based on the instruction from the control section 401, and outputs the uplink signal to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmission/reception section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The received signal processing section 404 outputs information decoded by the reception processing to the control section 401. The received signal processing section 404 outputs, for example, broadcast information, system information, an RRC signaling and DCI to the control section 401. Furthermore, the received signal processing section 404 outputs the received signal and/or the signal after the reception processing to the measurement section 405.

The measurement section 405 performs measurement related to the received signal. For example, the measurement section 405 performs measurement by using the downlink reference signal transmitted from the radio base station 10. The measurement section 405 can be composed of a measurement instrument, a measurement circuit or a measurement apparatus described based on the common knowledge in the technical field according to the present invention.

The measurement section 405 may measure, for example, received power (e.g., RSRP), received quality (e.g., RSRQ or a received SINR) or downlink channel information (e.g., CSI) of the received signal. The measurement section 405 may output a measurement result to the control section 401.

(Hardware Configuration)

In addition, the block diagrams used to describe the above embodiment illustrate blocks in function units. These function blocks (components) are realized by an optional combination of hardware and/or software. Furthermore, means for realizing each function block is not limited in particular. That is, each function block may be realized by one physically and/or logically coupled apparatus or may be realized by a plurality of these apparatuses formed by connecting two or more physically and/or logically separate apparatuses directly and/or indirectly (by way of, for example, wired connection and/or radio connection).

Figure 14:
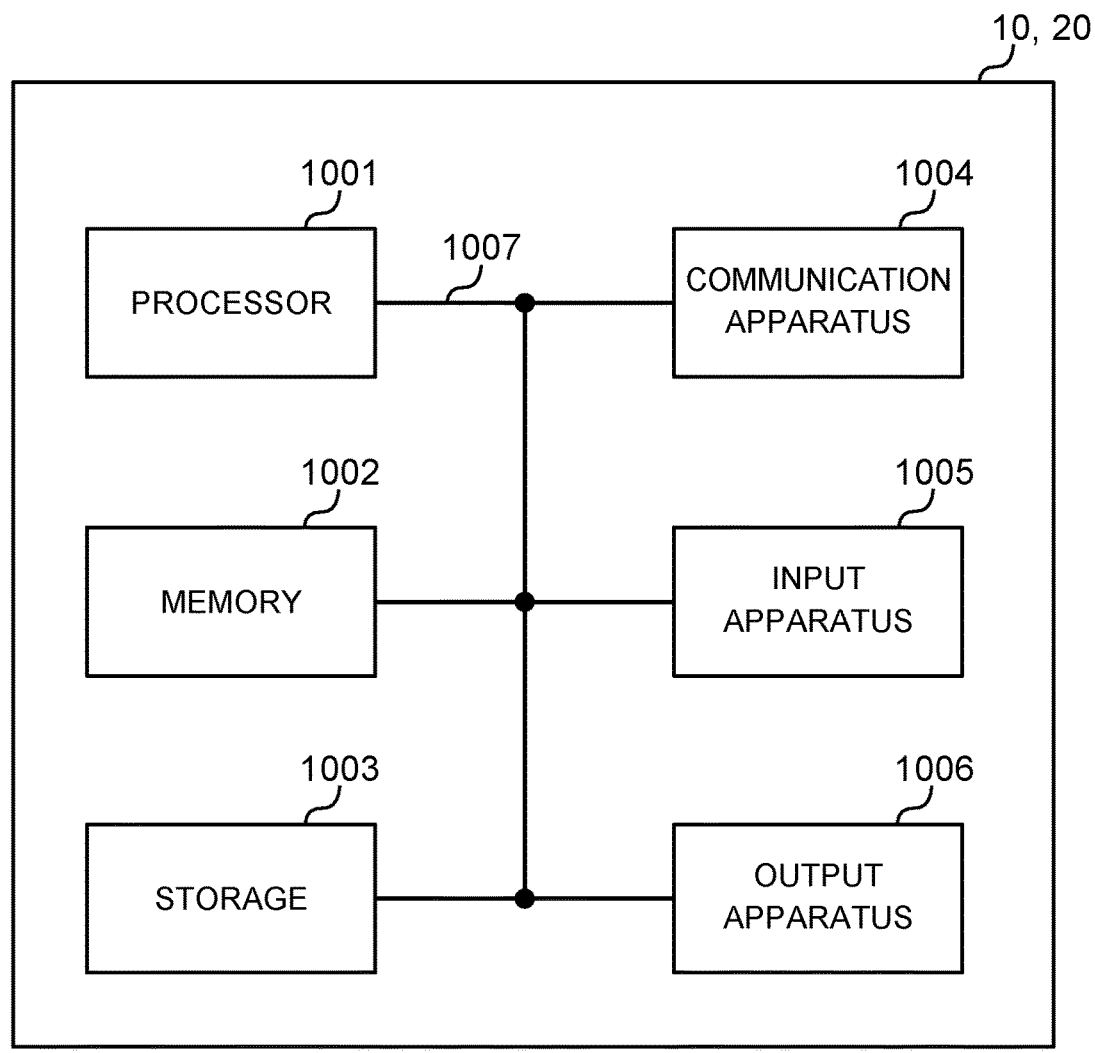
FIG. 14 is a diagram illustrating one example of hardware configurations of the radio base station and the user terminal according to the present embodiment.

For example, the radio base station and the user terminal according to the one embodiment of the present invention may function as computers that perform processing of the radio communication method according to the present invention. FIG. 14 is a diagram illustrating one example of the hardware configurations of the radio base station and the user terminal according to the one embodiment of the present invention. The above-described radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 14 or may be configured without including part of the apparatuses.

For example, FIG. 14 illustrates the only one processor 1001. However, there may be a plurality of processors. Furthermore, processing may be executed by 1 processor or processing may be executed by 1 or more processors concurrently or successively or by another method. In addition, the processor 1001 may be implemented by 1 or more chips.

Each function of the radio base station 10 and the user terminal 20 is realized by, for example, causing hardware such as the processor 1001 and the memory 1002 to read given software (program), and thereby causing the processor 1001 to perform an operation, and control communication of the communication apparatus 1004 and reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above-described embodiment are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment of the present invention.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via wired and/or radio networks, and will be also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above-described transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed of a single bus or may be composed of a bus that differs per apparatus.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may realize part or all of each function block. For example, the processor 1001 may be implemented by at least one of these types of hardware.

(Modified Example)

In addition, each term that has been described in this description and/or each term that is necessary to understand this description may be replaced with terms having identical or similar meanings. For example, a channel and/or a symbol may be signals (signalings). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time-domain. Each of one or a plurality of durations (frames) that composes a radio frame may be referred to as a subframe. Furthermore, the subframe may include one or a plurality of slots in the time-domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier-Frequency Division Multiple Access (SC-FDMA) symbols) in the time-domain. Furthermore, the slot may be a time unit based on the numerologies. Furthermore, the slot may include a plurality of mini slots. Each mini slot may include one or a plurality of symbols in the time-domain. Furthermore, the mini slot may be referred to as a sub slot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time period (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

Resource Blocks (RBs) are resource allocation units of the time-domain and the frequency-domain, and may include one or a plurality of contiguous subcarriers in the frequency-domain. Furthermore, the RB may include one or a plurality of symbols in the time-domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by absolute values, may be expressed by relative values with respect to given values or may be expressed by other corresponding information. For example, a radio resource may be instructed by a given index. Furthermore, numerical expressions that use these parameters may be different from those explicitly disclosed in this description.

Names used for parameters in this description are in no respect restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive ones.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by a management table. The information and signals to be input and output can be overwritten, updated or additionally written. The output information and signals may be deleted. The input information and signals may be transmitted to other apparatuses.

Notification of information is not limited to the aspects/embodiment described in this description and may be performed by other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (Master Information Blocks (MIBs) and System Information Blocks (SIBs)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by, for example, an MAC Control Element (MAC CE).

Furthermore, notification of given information (e.g., notification of "being X") is not limited to explicit notification, and may be performed implicitly (by, for example, not notifying this given information or by notifying another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSLs)) and/or radio techniques (e.g., infrared rays and microwaves), these wired techniques and/or radio techniques are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station will be also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can also provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used. The base station will be also referred to as a term such as a fixed station, a NodeB, an eNodeB (eNB), an access point, a transmission point, a reception point, a femtocell or a small cell in some cases.

The mobile station will be also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above-described radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above-described user terminal 20.

In this description, specific operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MMEs) or Serving-Gateways (S-GWs) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of the physical and logical connections. For example, "connection" may be read as "access". It can be understood that, when used in this description, the two elements are "connected" or "coupled" with each other by using 1 or more electric wires, cables and/or printed electrical connection, and by using electromagnetic energy having wavelengths in radio frequency domains, microwave domains and/or (both of visible and invisible) light domains in some non-restrictive and non-comprehensive examples.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiment described in this description. The present invention can be carried out as modified and changed aspects without departing from the gist and the scope of the present invention defined by the recitation of the claims. Accordingly, the disclosure of this description is intended for exemplary explanation, and does not have any restrictive meaning to the present invention.

The invention claimed is:

1. A terminal comprising:
a reception section that receives a downlink shared channel that is scheduled by first downlink control information; and
a control section that, when the terminal transmits an uplink shared channel over multiple slots and at least one slot of the multiple slots overlaps with a slot in which the terminal transmits a transmission acknowledgement signal for the downlink shared channel, controls to map the transmission acknowledgement signal in transmission of the uplink shared channel in a specific slot of the multiple slots,
wherein the control section applies, in each of the multiple slots, intra-slot frequency hopping to the uplink shared channel, and
wherein the control section maps, in each of the multiple slots, a demodulation reference signal to a first symbol of each of an uplink shared channel domain of a first hop and an uplink shared channel domain of a second hop.

2. The terminal according to claim 1, wherein the control section determines the specific slot based on the first downlink control information.

3. The terminal according to claim 1, wherein the control section determines allocation of the uplink shared channel based on second downlink control information and higher layer signaling.

4. The terminal according to claim 2, wherein the control section determines allocation of the uplink shared channel based on second downlink control information and higher layer signaling.

5. A radio communication method for a terminal, comprising:
receiving a downlink shared channel that is scheduled by first downlink control information; and
when the terminal transmits an uplink shared channel over multiple slots and at least one slot of the multiple slots overlaps with a slot in which the terminal transmits a transmission acknowledgement signal for the downlink shared channel, controlling to map the transmission acknowledgement signal in transmission of the uplink shared channel in a specific slot of the multiple slots;
applying, in each of the multiple slots, intra-slot frequency hopping to the uplink shared channel; and
mapping, in each of the multiple slots, a demodulation reference signal to a first symbol of each of an uplink shared channel domain of a first hop and an uplink shared channel domain of a second hop.

6. A base station comprising:
a transmission section that transmits a downlink shared channel that is scheduled by first downlink control information; and
a control section that, when a terminal transmits an uplink shared channel over multiple slots and at least one slot of the multiple slots overlaps with a slot in which the terminal transmits a transmission acknowledgement signal for the downlink shared channel, controls to receive the transmission acknowledgement signal that is mapped in transmission of the uplink shared channel in a specific slot of the multiple slots,
wherein, in each of the multiple slots, intra-slot frequency hopping is applied to the uplink shared channel, and
wherein, in each of the multiple slots, a demodulation reference signal is mapped to a first symbol of each of an uplink shared channel domain of a first hop and an uplink shared channel domain of a second hop.

7. A system comprising a terminal and a base station, wherein:

the terminal comprises:
- a reception section that receives a downlink shared channel that is scheduled by first downlink control information; and
- a first control section that, when the terminal transmits an uplink shared channel over multiple slots and at least one slot of the multiple slots overlaps with a slot in which the terminal transmits a transmission acknowledgement signal for the downlink shared channel, controls to map the transmission acknowledgement signal in transmission of the uplink shared channel in a specific slot of the multiple slots,
- wherein the first control section applies, in each of the multiple slots, intra-slot frequency hopping to the uplink shared channel, and
- wherein the first control section maps, in each of the multiple slots, a demodulation reference signal to a first symbol of each of an uplink shared channel domain of a first hop and an uplink shared channel domain of a second hop; and the base station comprises:
- a transmission section that transmits the downlink shared channel; and
- a second control section that controls to receive the transmission acknowledgement signal.

\* \* \* \* \*